United States Patent
Benzel et al.

(10) Patent No.: US 7,093,493 B2
(45) Date of Patent: Aug. 22, 2006

(54) PRESSURE SENSOR HAVING A SILICON CHIP ON A STEEL DIAPHRAGM

(75) Inventors: Hubert Benzel, Pliezhausen (DE); Masoud Habibi, Schwieberdingen (DE); Gilbert Moersch, Stuttgart (DE); Roland Guenschel, Reutlingen (DE); Jan Gebauer, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/055,473

(22) Filed: Feb. 9, 2005

(65) Prior Publication Data

US 2005/0178208 A1 Aug. 18, 2005

(30) Foreign Application Priority Data

Feb. 9, 2004 (DE) .................. 10 2004 006 201

(51) Int. Cl.
*E03B 1/00* (2006.01)

(52) U.S. Cl. ......................... 73/715; 257/419

(58) Field of Classification Search ............... 73/715; 257/419, 254; 310/311
See application file for complete search history.

(56) References Cited

U.S. PATENT DOCUMENTS 6,229,190 B1   5/2001  Bryzek et al.

2005/0000292 A1   1/2005  Muchow et al.
2005/0052092 A1*  3/2005  Laermer ..................... 310/311

FOREIGN PATENT DOCUMENTS

| DE | 41 30 044 | 8/2001 |
|---|---|---|
| DE | 101 56 406 | 6/2003 |
| DE | 10 2004 006 197 | 1/2005 |
| WO | WO 00/29824 | 5/2000 |

OTHER PUBLICATIONS

H.A. Kayal et al., Application-Specific Intelligent Sensors, Elektronik, Sep. 1998, pp. 112-117**.

* cited by examiner

*Primary Examiner*—Edward Lefkowitz
*Assistant Examiner*—Andre Allen
(74) *Attorney, Agent, or Firm*—Kenyon & Kenyon LLP

(57) ABSTRACT

A micromechanical device for measuring a pressure variable and a method for manufacturing a micromechanical pressure sensor. The sensor includes, two components; a first component featuring a diaphragm made of a first material, and a second component of a second material. This second component is designed to have a thin first region and a thick second region. The first and second components are permanently joined together via the first diaphragm and at least a portion of the first region. The materials are selected such that the temperature expansion coefficient of the first material is higher than that of the second material. The first and second components are joined in such a manner that a lateral expansion of the first diaphragm caused by temperature changes is transferred to the first region of the second component as a lateral expansion as well.

19 Claims, 4 Drawing Sheets

PRESSURE SENSOR HAVING A SILICON CHIP ON A STEEL DIAPHRAGM

FIELD OF THE INVENTION

The present invention relates to a micromechanical device for measuring a pressure variable and a method for manufacturing a micromechanical device.

BACKGROUND INFORMATION

Micromechanical pressure sensors are frequently composed of different components (such as substrate, base, housing), which are joined together and have different thermal expansion coefficients, as illustratively described in German Patent Application No. DE 103 30 252 A1. In this context, different thermal expansions may lead to thermal stresses, which negatively affect the junctions or also the functional elements of a pressure sensor, such as the diaphragm and/or the strain gauge. This may result in corruption of the measured signal or increased susceptibility of the pressure sensor to mechanical destruction.

German Patent No. DE 41 30 044 C2 describes a semiconductor pressure sensor having a silicon substrate, a diaphragm formed from the substrate, strain gauges, as well as a base joined to the substrate. There, the substrate and the base have different thermal expansion coefficients. In order to prevent an unwanted signal component in the strain gauges caused by different thermal stresses in the substrate and the base, an octagonal diaphragm is produced in the substrate, the octagonal diaphragm uniformly distributing the thermal stress in the diaphragm.

A further way to compensate for corruption of the measured signal caused by thermally induced thermal stresses is described in the publication H. A. Kayal et al., "Anwendungsspezifische intelligente Sensoren" (Application-Specific Intelligent Sensors), Elektronik (Electronics) 09/1988, pp.112–117. There, the temperature dependence of the measured signal is compensated using a complex integrated circuit.

World Patent WO 00/29824 and U.S. Pat. No. 6,229,190 B1 describe semiconductor elements having recesses next to the diaphragm and the diaphragm surround. These recesses are used to maximize the measured signal, which is acquired by piezoresistive elements, by preventing edge effects that can be observed upon mounting the diaphragm.

German Patent Application No. DE 101 56 406 A1 describes a method in which a pressure sensor is implemented using a strain gauge on a deformation sensor. The bond between the strain gauge and the surface of the deformation sensor is illustratively accomplished using low-melting glass (seal glass) or epoxy adhesive. Moreover, one exemplary embodiment shows that the deformation sensor has a steel body with a diaphragm at the extremity, and that the strain gauge is produced from a silicon wafer.

SUMMARY

The present invention describes a micromechanical device for measuring a pressure variable and a method for manufacturing a micromechanical pressure sensor including two components; a first component featuring a diaphragm made of a first material and a second component of a second material. This second component is designed to have a thin first region and a thick second region. The first and second components are permanently joined together via the first diaphragm and at least a portion of the first region. The first and second materials are selected such that the temperature expansion coefficient of the first material is greater than that of the second material. In accordance with the present invention, the first and second components are joined in such a manner that a lateral expansion of the first diaphragm caused by temperature changes is transferred to the first region of the second component as a lateral expansion as well.

Such a design of a micromechanical device for measuring a pressure variable makes it possible that a change of the first diaphragm provided to measure the pressure of a medium can be transmitted nearly unchanged to the second component, in particular to the first region. In this connection, both a change caused by vertical deflection of the diaphragm due to pressure changes as well as changes caused by thermal effects can be transmitted. Thus, the state of the first diaphragm is copied almost identically to second region.

Advantageously, the first diaphragm of the first component and the first region of the second component are joined by a first joining material. This permanent bond allows movements of the first diaphragm to be transferred to the thin first region without appreciable loss.

Moreover, by using an adhesive and/or solder or seal glass solder as a first joining material, it is possible to do without a special surface structure of the first diaphragm because the first joining material can cover the diaphragm surface uniformly and homogeneously. Moreover, the first component may have a base in addition to the first diaphragm. In a further embodiment, this base can be used to produce a further bond between the base and the second region of the second component using a second joining material. The advantage of this second bond is that the contact area of the second component with the first component is enlarged. Thus, the transition from the thin first region to the thick second region of the second component is mechanically relieved. The second joining material proposed is ductile material which is relatively soft when not stressed and becomes harder under the action of pressure. Thus, after joining the first component to the second component, a bonding wire can be applied to the surface of the second component without causing the second component to break.

Moreover, it is proposed that the first and second regions of the second component be largely separated by a third region. In this connection, provision can be made for the third region to have relief grooves which separate a lateral expansion of the material in the first region from a lateral expansion of the material in the second region. In this context, the lateral expansion of the material of the material in the first region may be produced by the first diaphragm, which has a higher temperature expansion coefficient than the material of the thin first region.

Advantageously, the first component may contain steel, ceramic, Invar, Kovar, or an iron-nickel alloy as the first material. One particular embodiment of the present invention proposes that only the first diaphragm be made of a metal or steel. Thus, it is possible to use steels that are particularly suitable for pressure sensor diaphragms. In this connection, it is possible to use high-grade steels that are particularly resistant to corrosion, for high-pressure applications, steels of particularly high tensile strength or alloys whose thermal expansion coefficients are matched to silicon. Moreover, the second component may be composed of a semiconductor material. In one particular embodiment of the present invention, the second component is composed of silicon or a silicon compound. It is also advantageous to produce a second diaphragm in the thin first region. In order to measure the pressure variable, the second component may contain at least one piezoelectric resistor which experiences a change in resistance as a function of the vertical movement of the first diaphragm. In this connection, provision is preferably made for the at least one piezoelectric resistor to be located in or on the first region, in particular on the second diaphragm, of the second component. The second component may have at least one circuit trace via which an electrical signal generated as a function of a pressure applied to the first diaphragm is transmitted to an evaluation circuit. Advantageously, a fourth region on the second component accommodates at least part of an electrical circuit, which may be separated from the second region by a third region and/or can be used to evaluate the change in resistance of the piezoresistors when measuring the pressure variable. By separating the electrical circuit or electrical components by relief grooves, it is possible to suppress thermally or stress-induced mechanical strains, which could possibly corrupt the measured value.

The relief grooves are advantageously formed on or in the second component in such a manner that thermally and/or mechanically induced lateral expansions of at least a portion of the first region end at the relief grooves and are not transferred to the second region. Moreover, the relief grooves can be partially interrupted to allow circuit traces to be routed from the first region to the second region.

In a further refinement of the present invention, the first region of the second component is provided with cut-outs.

These cut-outs can be selected such that specifiable structures remain in the first region; the specifiable structures being joined to the first diaphragm. Advantageously, as described above, lateral stresses caused, for example, by thermal expansion of the first diaphragm, are transferred to the first region through the permanent bond. However, the special design of the specifiable structures allows the induced lateral stresses to be already compensated for in the first region. Thus, for example, it is possible to form the specifiable structures as thin meander-shaped strips which, at the same time, can be used to produce a connection to the first diaphragm.

Advantageously, piezoelectric resistors capable of being used to measure the pressure variable are provided on at least part of the specifiable structures. However, it is also possible that the specifiable structures themselves constitute measuring resistors.

Moreover, a semiconductor chip configuration including a thin first region featuring the diaphragm and a thicker second region at the edge of the semiconductor substrate is advantageous during the alignment of the semiconductor chip to the steel substrate, the proviso being that proper dimensions are chosen.

In accordance with one further embodiment of the present invention, the first and second components are processed separately before they are joined by the first joining material. This has the advantage that sensitive process steps required for a component (such as etching the cavity, making the circuit traces and/or the circuit) can be carried out without being affected by process steps during the production of the other component.

DETAILED DESCRIPTION OF EXAMPLE EMBODIMENTS

Figure 1:
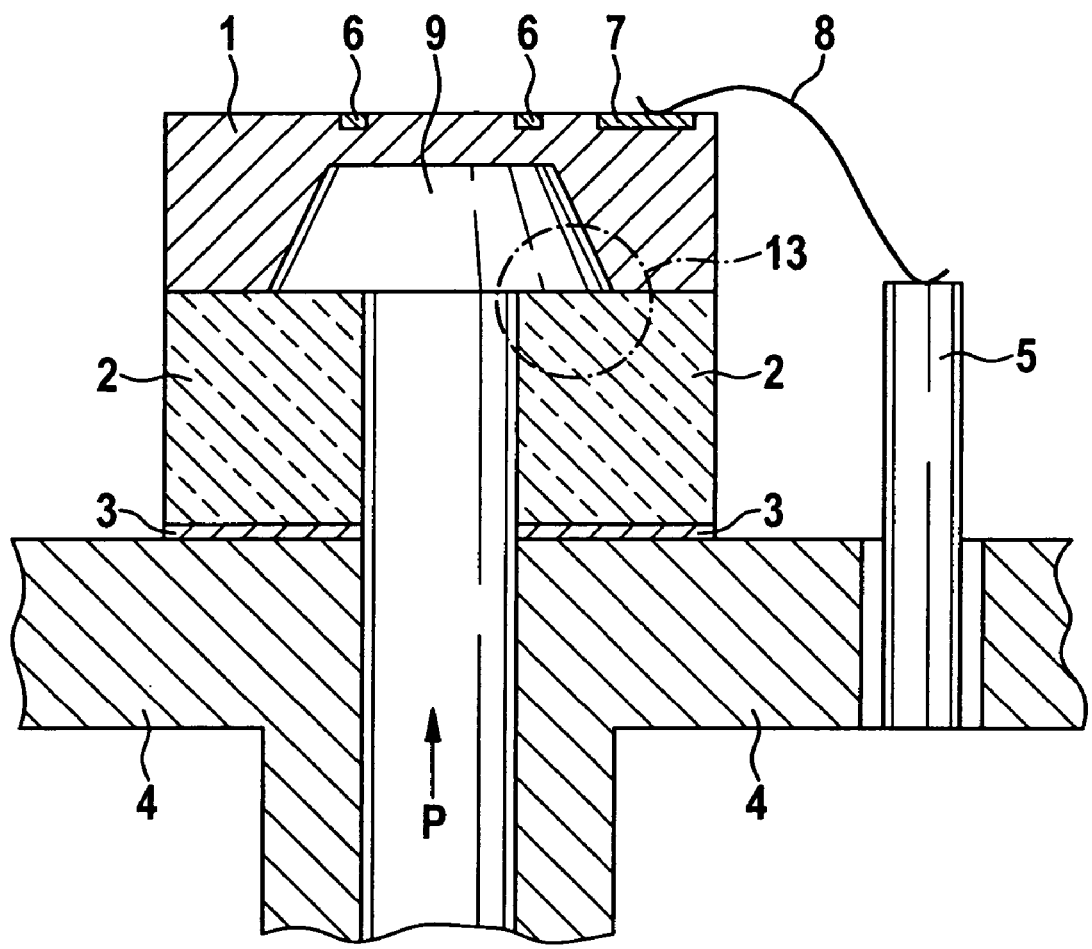
FIG. 1 shows a conventional pressure sensor made of a combination of different components.

A sensor design as shown in FIG. 1 represents the state of the art. There, a sensor chip 1 is anodically bonded to an intermediate glass layer or a glass base 2 composed of sodium-containing glass. Glass base 2 is metallized on the backside and attached to a metal base 4 (for example, a T08 base) by solder 3. The conventional sensor chip 1 can be composed of a pure resistance bridge featuring piezoresistive resistors 6, or be combined with an evalluation circuit 7 connected via circuit traces, which are integrated on sensor chip 1 in a semiconductor process along with piezoresistors 6. Piezoresistive resistors 6 and/or evaluation circuit 7 are connected via at least one corresponding bonding wire 8 to a terminal 5 which allows the measured signals to be transmitted to control systems.

In the conventional pressure sensor shown in FIG. 1, the diaphragm is made by anisotropic etching, for example, using KOH or TMAH. However, in the case of the sensor design described, using the pressure sensor in the high-pressure range may lead to shortened service life because this construction is only designed for low to medium pressure ranges. Characteristic in this connection are, for example, small transition radii between the cavity side and the diaphragm. Especially in the case of time-etched diaphragms, these transition radii are particularly small. These small transition radii lead to high mechanical stresses at the transition, the mechanical stresses reducing the bursting strength. Moreover, the anisotropic etching produces a typical cavity 9 having flat cavity walls inclined at 54°. These flat cavity walls offer a very large surface area upon which the applied pressure can act, and via which the pressurized medium can exert force on silicon chip 1. Moreover, as shown in FIG. 1, in the case of the etching process yielding flat cavity walls, the bonding area in silicon chip 1 (connecting area between the silicon and the glass), becomes smaller as well, which further increases the load per unit area. Both points(large surface area of the cavity walls and small bonding area) lead to a lower bursting strength. Under compressive loading, the step formed at this transition from silicon to glass (region 13 in FIG. 1) leads to high mechanical stresses in the glass, which also reduces the bursting strength.

As already described, a pressure sensor as shown in FIG. 1 is not suitable for high pressures because the pressure acting between silicon chip 1 and glass base 2 and/or different thermal expansion coefficients can lead to large differences in stresses, limiting the scope of application of the pressure sensor.

Figure 2:
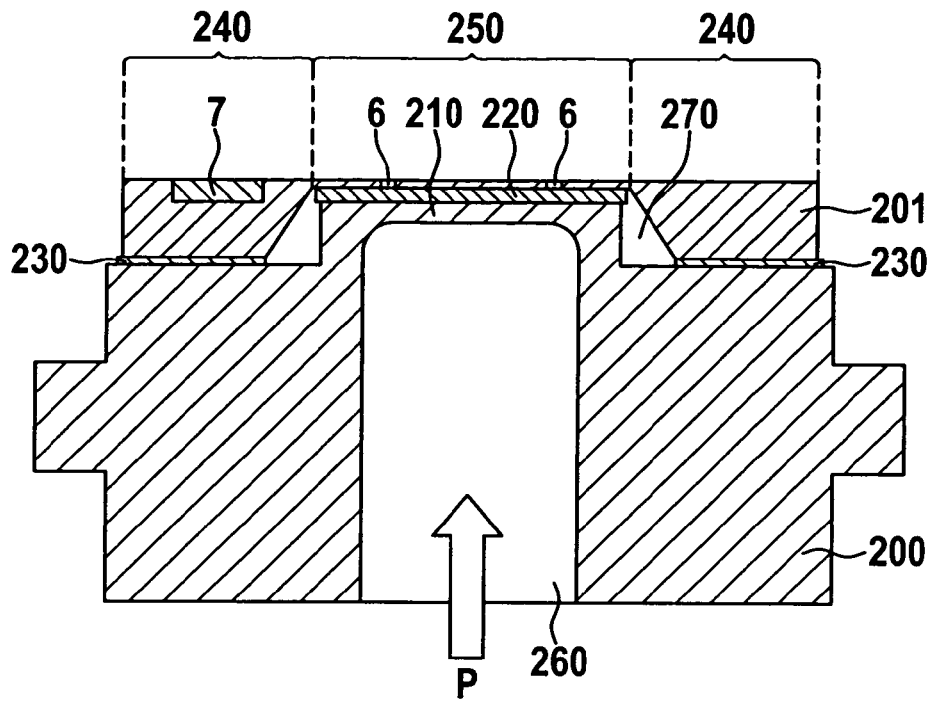
FIG. 2 shows a combination of a pressure sensor made of a silicon substrate and a steel substrate.

In a special embodiment of a pressure sensor, therefore, a semiconductor chip or semiconductor substrate 201 can be mounted on a steel substrate 200, as shown in FIG. 2, to be able to measure higher pressures. This steel substrate 200 has a steel diaphragm 210 and a cavity 260. An adhesive or solder (such as seal glass) is applied to steel diaphragm 210, joining semiconductor substrate 201 to steel substrate 200. The representation in FIG. 2 shows that the semiconductor substrate can be roughly divided into two different regions 240 and 250. A thin region 250 is surrounded by a thick region 240. This thin region 250 forms a kind of a diaphragm, which is permanently joined to steel diaphragm 210 by the adhesive or solder 220. Moreover, the thicker region 240 of the semiconductor substrate is also joined to steel substrate 200 by a second, preferably soft joining material 230. However, since in this region semiconductor substrate 201 is optionally provided with integrated circuits, which are used, for example, to assist in evaluating the measured pressure signals, and which are electrically bonded, for example, by bonding wire (see 5, 7 and 8 in FIG. 1), a so-called "ductile" material, which becomes harder under pressure but otherwise remains soft, is proposed for use as the second joining material. Thus, thermally induced lateral stresses are prevented from being transferred from the base of steel substrate 200 to the thicker second region of semiconductor substrate 201.

When the medium whose pressure is to be measured by the pressure sensor is introduced into cavity 260, then steel diaphragm 210, connecting layer 220 and the semiconductor diaphragm in region 250 bend in such a manner that piezoresistors 6 located on the semiconductor diaphragm can electrically measure the deformation. The pressure variable so measured can then be transmitted via circuit traces to electrical circuits 7 or evaluation units of a different type.

When using, for example, silicon as semiconductor substrate 201, then the semiconductor diaphragm in region 250 can be made using an anisotropic process, as mentioned earlier. Since, typically, inclined walls are formed in the process, a hollow space 270 may be formed between the cavity wall and steel substrate 200. Therefore, to avoid unnecessary sources of error during pressure measurement, provision is to be made that the deposition of the semiconductor substrate 201, in particular of the silicon substrate, on the steel substrate be carried out in vacuum. However, the problem can also be adequately solved by making vent holes in the steel substrate or by leaving openings when applying joining material 230.

In another embodiment of the present invention, diaphragm 210 and/or substrate 200 can also be made, for example, of ceramic, Invar, or Kovar (an iron-nickel alloy).

Figure 3:
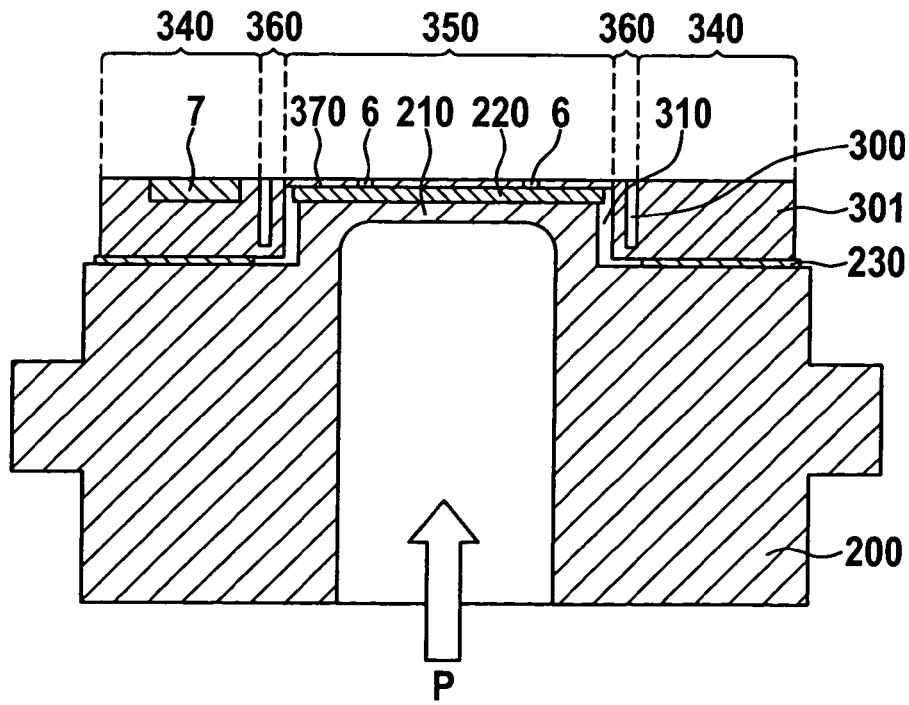
FIG. 3 shows a pressure sensor that is modified as compared to FIG. 2.

FIG. 3 shows a slightly different embodiment of a pressure sensor combined of semiconductor substrate and steel substrate. In the case of semiconductor substrate 301, as is shown in FIG. 3, the semiconductor material in region 350 is produced using a trench process in order to produce diaphragm 370. This process produces nearly vertical cavity walls, together with equally vertical walls of steel substrate 200, form smaller hollow spaces 310 compared to the embodiment in FIG. 2. Moreover, a further region 360 featuring relief grooves 300 was introduced in semiconductor substrate 301 between regions 340 and 350, which correspond to regions 240 and 250 of FIG. 2. These relief grooves 300, just as diaphragm 370 in region 350, can be made using conventional semiconductor technology methods. For this purpose, it is preferable to use anisotropic plasma etching processes, such as trench etching.

In a pressure sensor according to one of the FIGS. 2 or 3, it is problematic that the temperature expansion coefficients (TEC) of the material of semiconductor substrate 201 and 301, respectively, can differ very strongly from that of steel substrate 201. These large differences, for example, of silicon and steel, lead to high mechanical stresses in the mounting region of silicon diaphragm 370. When steel diaphragm 210 expands with temperature, then the very thin silicon diaphragm 370, which is rigidly connected to steel diaphragm 210 by solder 220, is forced to expand as well. Due to the elastic properties of thin silicon layers, diaphragm 370 in region 350 can follow these expansions. However, the edge of silicon chip 301 is much thicker than silicon diaphragm 370, so that it expands less because of the lower TEC. Due to the different expansion, high mechanical stress develops at the transition of silicon diaphragm 370 to the edge of silicon chip 301, which may destroy the diaphragm. In contrast to the design according to FIG. 2, the inventive design according to FIG. 3 avoids this by using a relief groove in silicon substrate 301 in order to suppress thermally induced stresses in the silicon. Preferably, this relief groove is provided in the silicon in the form of a recess which surrounds substantially the entire diaphragm region 350.

Figure 4A:
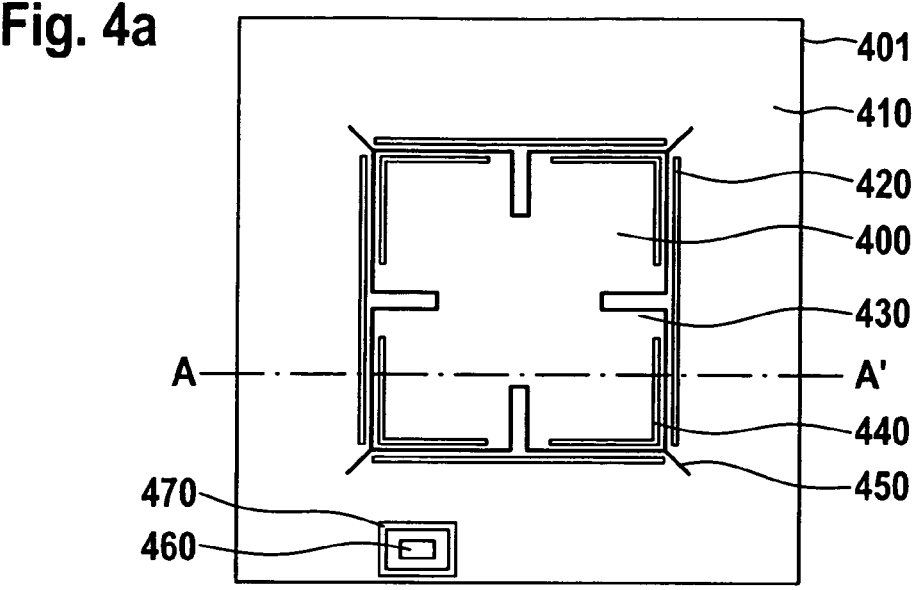
FIG. 4a is the top view and FIG. 4b is a cross-section of an example embodiment of a pressure sensor according to the present invention.

Usually, as shown in FIG. 4a, piezoresistive resistors 430 are placed on semiconductor diaphragm 400. Upon deformation of diaphragm 400, these piezoresistive resistors, for example, in the form of a Wheatstone bridge, provide different contributions to measure the pressure variable. To electrically connect piezoresistive resistors 430 to an evaluation circuit, circuit traces 450 are provided on the surface of semiconductor substrate 401, for example, using typical micromachining processes. In this context, for routing circuit traces 450 across the surface of semiconductor substrate 401, relief grooves 420 and 440 need to be arranged in a convenient manner. FIG. 4a shows a particular form of such an arrangement, including an inner relief groove 440 and an outer relief groove 420 between which circuit trace 450 can be routed from diaphragm region 400 to circuit region 410 at the edge of semiconductor substrate 401. Circuit region 410 can be used to accommodate parts of the evaluation circuit or other integrated circuits 460, which can also be isolated by relief grooves 470.

Figure 4B:
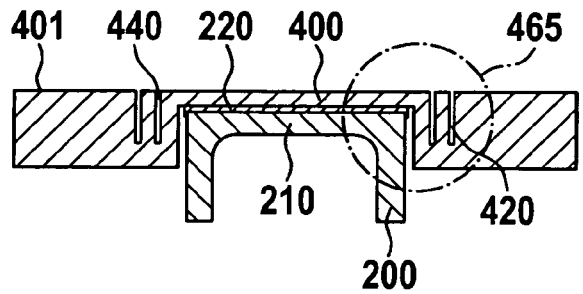

In a cross-section through the arrangement in FIG. 4a along line AA', a pressure sensor design similar to FIG. 3 can be shown in FIG. 4b. A semiconductor substrate or semiconductor chip 401 including the diaphragm region 400 is permanently mounted on steel substrate 200 including the steel diaphragm 210 via a joining material 220. Relief grooves 420 and 440 are provided in semiconductor substrate 401 as recesses, as shown in marked region 465. The area of the optional evaluation circuit can also be protected against mechanical influences through stress isolation.

Figure 5A:
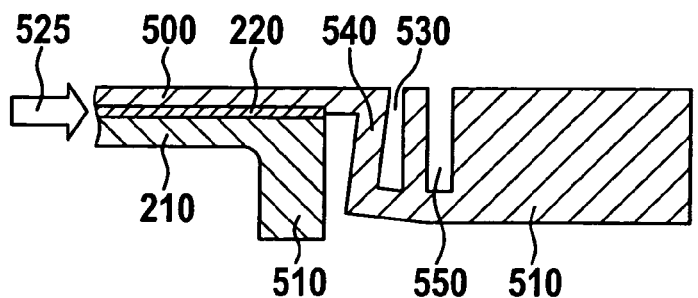
FIGS. 5a and 5b show different expansion behaviors of the semiconductor/steel substrates by way of cross-sections.
Figure 5B:
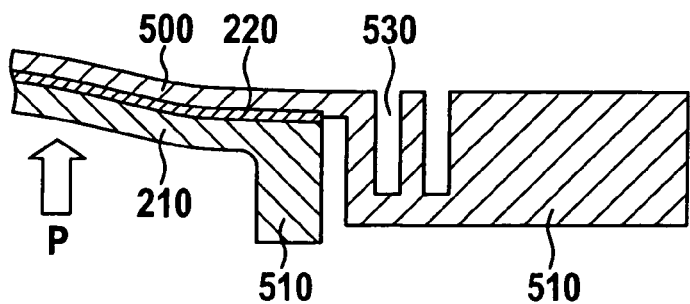

The effect of the relief grooves is graphically shown in FIG. 5a. Due to the different temperature expansion coefficients (TEC) of steel 200 and of the semiconductor material, an expansion of steel diaphragm 210 produces thermally induced stress in semiconductor diaphragm 500 in the direction of arrow 525. Since, due to the lower temperature expansion coefficient as compared to the steel ($TEC_{steel} > TEC_{semiconductor(e.g., silicon)}$), the edge of semiconductor substrate 510 expands less, differences in stresses and damage to the diaphragm may occur, especially at the diaphragm surround. Due to the relief grooves 530 and 550, the thermally induced stress so generated is not transferred to the edge of semiconductor substrate 510. This is prevented by allowing semiconductor diaphragm 500 to expand parallel to the surface, whereby transition 540 moves from the diaphragm toward relief groove 530, thus compensating for the expansion. However, when semiconductor diaphragm 500 is required to expand in a vertical direction as shown in FIG. 5b, for example, when steel diaphragm 210 is used, as intended, for pressure sensing, then transition 540 remains in its position.

Figure 6A:
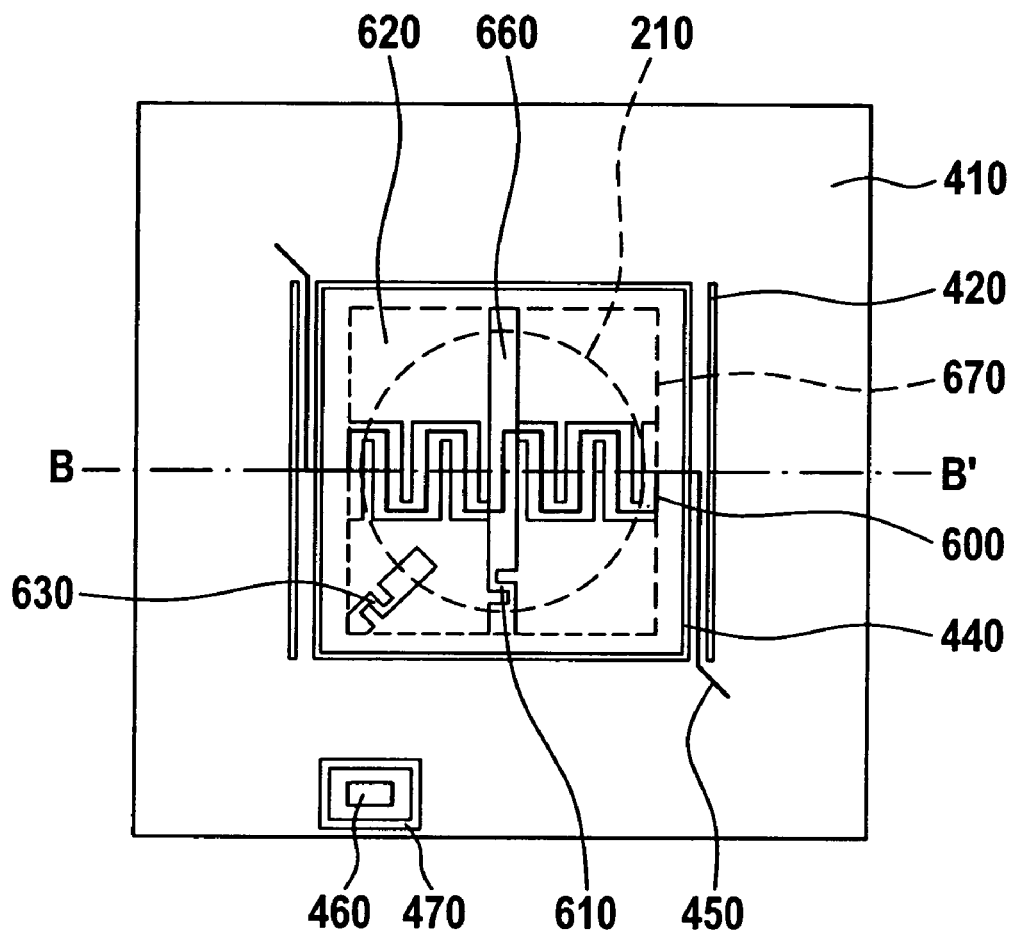
FIGS. 6a and 6b show a further embodiment of the present invention in a top view and in the cross-section, respectively.

Another specific embodiment of the present invention is shown in FIG. 6a. Measuring resistor 600, which is preferably provided as a piezoresistive resistor, is designed as a silicon meander having one or more loops. Such meanders can be made by initially producing a diaphragm which is bounded by a frame 670 and which is then locally etched through to form a corresponding pattern, preferably using anisotropic plasma etching processes. In the process, structured retaining elements are produced above steel diaphragm 210, such as are illustrated by 610, 630 and 660 in FIG. 6*a*; the retaining elements supporting piezoresistive resistor 600. However, in one specific embodiment, provision may also be made for the holding elements to be directly designed as piezoresistive resistors or measuring resistors. Between retaining elements 610, 630 and 660, the diaphragm, which is bounded by frame 670, is opened down to steel substrate 200, for example, using a trench etching process. In this connection, it is proposed, in particular, that resistor structure 600 run above steel diaphragm 210. In the cross-section of FIG. 6*b* along line BB' of FIG. 6*a*, it can be seen that diaphragm 640 has no continuous closed surface.

Similarly to stress-relief grooves 420 and 440, meander shape 600 can relieve thermally induced stresses. Moreover, the holding elements may optionally be attachable to strips 660. It is possible to combine meander-shaped resistors and relief grooves, thus making it possible to achieve the best isolation. Moreover, it is possible for the fastening strips to be shaped as meanders, as shown in region 610.

Figure 6B:
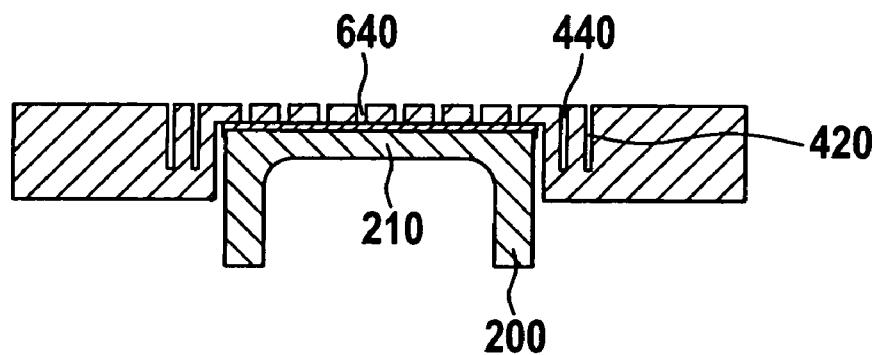

Besides the rectangular diaphragms outlined in FIGS. 4*a* and 6*b*, it is, of course, also possible to use differently shaped diaphragms to produce the present invention. Furthermore, a semiconductor chip configuration including a thin first region featuring the diaphragm and a thicker second region at the edge of the semiconductor substrate is advantageous during the alignment of the semiconductor chip to the steel substrate, the proviso being that proper dimensions are chosen.

What is claimed is:

1. A micromechanical device for measuring a pressure variable, comprising:
   a first component including a first diaphragm made of a first material; and
   a second component made of a second material, the second component including a first region and a second region, the first region having a thinner design compared to the second region, the first diaphragm and at least a portion of the first region being permanently joined together, the first material having a higher temperature expansion coefficient compared to the second material;
   wherein:
   the first diaphragm made of the first material transfers a lateral expansion to the first region of the second component as a function of the temperature.

2. The device as recited in claim 1, further comprising:
   a first joining material between the first diaphragm and the first region, the transfer of the lateral expansion taking place via the first joining material.

3. The device as recited in claim 1, further comprising:
   a first joining material, the first diaphragm and the first region of the second component being joined by the first joining material, the first joining material containing an adhesive, a solder or a seal glass.

4. The device as recited in claim 1, wherein the first component further includes a base, the second region of the second component being joined to the base by a second joining material, the second joining material becoming harder under pressure.

5. The device as recited in claim 1, wherein the first and second regions of the second component are separated by a third region; the third region having relief grooves which separate a lateral expansion of the first region from the second region.

6. The device as recited in claim 1, wherein, at least one of:
   (i) the first material is steel, ceramic, Invar, Covar, or an iron-nickel alloy; and
   (ii) the second component at least one of: i) contains a semiconductor material as the second material, ii) includes a second diaphragm in the first region, iii) has at least one piezoelectric resistor in the first region, iv) includes at least one circuit trace, and v) includes at least part of an electrical circuit in a fourth region.

7. The device as recited in claim 4, wherein the second component includes, at least part of an electrical circuit in a fourth region, the fourth region being at least partially separated from the second region by a third region.

8. The device as recited in claim 1, wherein the second component includes at least part of an electrical circuit, the circuit being configured to evaluate changes in resistance of piezoresistors when measuring a pressure variable.

9. The device as recited in claim 5, wherein at least one of:
   (i) a thermally and mechanically induced lateral expansion of at least a portion of the first region ends at the relief grooves; and
   (ii) the relief grooves are partially interrupted as a function of a routing of circuit traces on the second component.

10. The device as recited in claim 1, wherein the first region of the second component has cut-outs and is joined to the first diaphragm via structures, the structures configured to compensate for induced lateral stresses in the first region with respect to the second region.

11. The device as recited in claim 10, wherein the structures include piezoelectric resistors for measuring the pressure variable.

12. A method for manufacturing a micromechanical pressure sensor, comprising:
   providing a first component including a first diaphragm made of a first material;
   providing a second component made of a second material, the second component including a first region and a second region, the first region having a thinner design compared to the second region; and
   joining together the first component and the second component in such a manner that the first diaphragm and at least one portion of the first region are permanently joined together;
   wherein the first material has a higher temperature expansion coefficient compared to the second material, and the first diaphragm transfers a lateral expansion to the first region of the second component as a function of temperature, the transfer of the lateral expansion taking place via a first joining material between the first diaphragm and the at least one portion of the first region.

13. The method as recited in claim 12, wherein at least one of: i) the first diaphragm and the first region of the second component are joined by a first joining material, the first joining material including one of an adhesive, solder or seal glass, and ii) the second component has a base, the second region of the second component and the base being joined by a second joining material, the second joining material becoming harder under pressure.

14. The method as recited in claim 12, wherein the first and second regions of the second component are separated by a third region, the third region having relief grooves which separate a lateral expansion of the first region from the second region.

15. The method as recited in claim 12, wherein at least one of:
  (i) the first diaphragm in the first component is made of steel, ceramic, Invar, Covar, or an iron-nickel alloy;
  (ii) the second component is made from a semiconductor material;
  (iii) the first region of the second component include, a second diaphragm, and at least one piezoelectric resistor, for measuring the pressure variable; and
  (iv) the second component, includes at least one circuit trace, part of an electrical circuit is made in a fourth region.

16. The method as recited in claim 15, wherein the first and second components are processed separately before being joined.

17. The method as recited in claim 14, wherein at least one of:
  (i) at least one of a thermally and mechanically induced lateral expansion of at least a portion of the first region ends at the relief grooves; and
  (ii) the relief grooves are partially interrupted depending on circuit traces on the second component.

18. The method as recited in claim 14, wherein the first region of the second component includes a second diaphragm, the second diaphragm in having cut-outs, and the first region is joined to the first diaphragm via structures, the structures configured to compensate for induced lateral stresses in the first region with respect to the second region.

19. The method as recited in claim 18, wherein the structures include piezoelectric resistors for measuring the pressure variable.

* * * * *